No. 664,601. Patented Dec. 25, 1900.
J. H. ANDERSON.
HAND CULTIVATOR.
(Application filed Aug. 27, 1900.)
(No Model.)
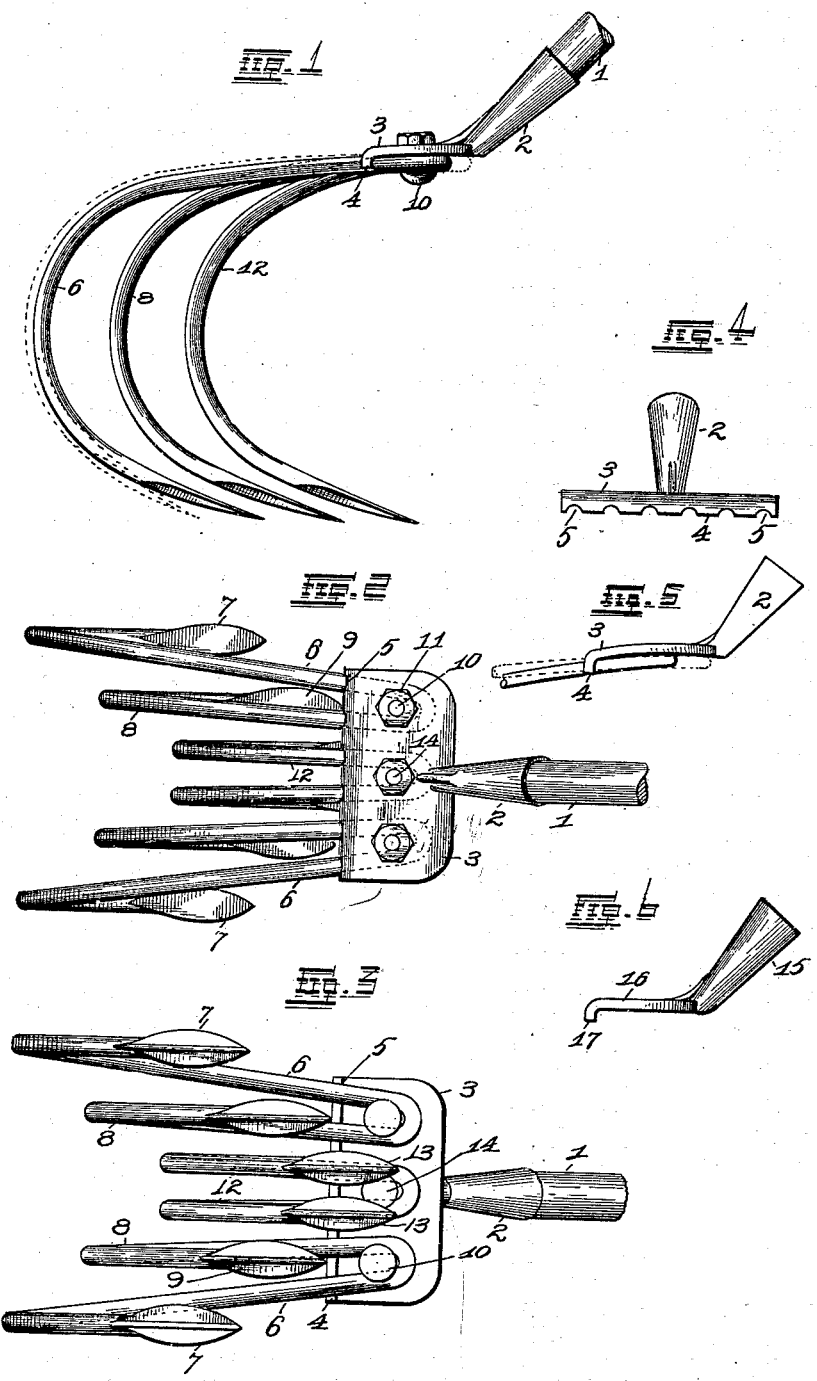
Witnesses
Alfred W Eicker
John D Riffey
Inventor
J. H. Anderson
By Higdon & Longan, Att'ys

UNITED STATES PATENT OFFICE.

JOSEPH H. ANDERSON, OF ST. LOUIS, MISSOURI, ASSIGNOR OF ONE-FOURTH TO G. C. FORRY, OF SAME PLACE.

HAND-CULTIVATOR.

SPECIFICATION forming part of Letters Patent No. 664,601, dated December 25, 1900.

Application filed August 27, 1900. Serial No. 28,196. (No model.)

*To all whom it may concern:*

Be it known that I, JOSEPH H. ANDERSON, of the city of St. Louis, State of Missouri, have invented certain new and useful Improvements in Hand-Cultivators, of which the following is a full, clear, and exact description, reference being had to the accompanying drawings, forming a part hereof.

This invention relates to hand-cultivators; and it consists of the novel construction, combination, and arrangement of parts hereinafter shown, described, and claimed.

Figure 1 is a side elevation of my improved hand-cultivator. Fig. 2 is a plan view from above. Fig. 3 is a view corresponding to Fig. 2 looking from below. Fig. 4 is a front view of an attachment by means of which the plow-points are attached to the handle. Fig. 5 is a view showing the attachment having a pronounced concavity in the under side whereby the arms carrying the plow-points may be adjusted at various angles. Fig. 6 is a detail view showing a modified form of the attachment.

In the construction of my improved hand-cultivator I provide a handle 1, secured to the lower end of which is a ferrule 2, integral with which is a plate 3. The said plate 3 is preferably formed with a concaved under surface and is provided on its forward edge with a depending flange 4, formed in which at suitable intervals are notches 5.

6 indicates the outer arms or plow-beams, formed on the lower ends of which are the plow-points 7. The arms 6 are integral with the second arms 8, forming a continuous U-shaped rod, and on the lower ends of the arms 8 are formed the plow-points 9, which, as shown, are a suitable distance in advance of the plow-points 7. The arms 6 and 8 rest within the notches 5, and a bolt 10 passes between the said arms and through an opening in the plate 3 and carries on its upper end a nut 11, whereby the said bolt may be tightened and the arms 6 and 8 be retained firmly in position. The concaved under surface of the plate 3 causes the arms 6 and 8 to be gripped very firmly whenever the nut 11 is tightened, drawing the head of the bolt closely against the under side of the said arms. This concavity also allows the arms to be adjusted at various angles relative to the handle, which results in much greater convenience to the user. The construction of arms on both ends of the plate 3 is identical. By having the arms formed in series and integral with each other a single plate may be used to attach the arms to the handle, and a single bolt is all that is required to attach each pair of arms to the plate.

Carried within the two central notches 5 are the shorter arms 12, which are integral with each other and are provided on their lower ends with the plow-points 13, which are even with each other and are a suitable distance in advance of the plow-points 7 and 9. A central bolt 14 passes between the arms 12, thereby forming a means by which the said arms 12 may be rigidly retained in position.

In Fig. 6 is shown a modified form of plate by means of which the plow-points may be attached to the handle and comprises the ferrule 15 at a suitable angle with a plate 16, having a smooth under surface and provided on its forward edge with a depending flange 17, having a plurality of notches corresponding to the notches 5. The plow-points are attached to the plate 16 by means of bolts corresponding to the bolts 10 and 14.

A hand-cultivator constructed as described forms a very convenient tool for the cultivation of garden-plants. The plow-points may be securely attached to the plate and may be removed therefrom in case of injury and others secured to the plate instead. The device is light and simple and possesses superior advantages over those of ordinary construction. It may be stated in this connection that the elevations 4 are wider than the diameter of the bolt, and premising this fact it will be readily seen by referring to Figs. 2 and 3 that when the plow-beams are adjusted toward the handle the plow-points will be drawn closer together and when the plow-beams are adjusted in the opposite direction the plow-points are separated, and by this method the relative position of the plow-points toward each other may be adjusted, and also by the curved plate the plow-points may be adjusted at different angles relative to the handle.

I claim—

1. A hand-cultivator, comprising a handle, a suitable concaved plate carried by the said handle, a plurality of plow-points supported by the said plate and means for adjusting the said plow-points at different elevations relative to said plate, substantially as specified.

2. A hand-cultivator, consisting of a handle, a plate carried by said handle, a flange integral with said plate, there being a series of notches formed in said flange, and a plurality of arms having plow-points on their lower ends carried by the said plate, the said arms being within the said notches, substantially as specified.

3. A hand-cultivator, consisting of a handle, a plate having an integral depending flange and notches formed in said flange, carried by the said handle, a series of pairs of arms, the arms of each pair being integral with each other, and resting in the said notches, a single fastening device for each pair of arms, plow-points formed on the said arms, and means for adjusting the said plow-points at different elevations relative to the said plate, substantially as specified.

In testimony whereof I affix my signature in presence of two witnesses.

JOSEPH H. ANDERSON.

Witnesses:
ALFRED A. EICKS,
M. GRIFFIN.